United States Patent [19]

Birkbeck

[11] Patent Number: 5,263,678
[45] Date of Patent: Nov. 23, 1993

[54] APPARATUS FOR PERIODICALLY DISPLACING A DISPLAY TERMINAL

[75] Inventor: Roger M. Birkbeck, Newtown, Pa.
[73] Assignee: Norbac Corporation, Newtown, Pa.
[21] Appl. No.: 740,445
[22] Filed: Aug. 5, 1991

Related U.S. Application Data

[63] Continuation-in-part of Ser. No. 512,336, Apr. 23, 1990, abandoned.

[51] Int. Cl.⁵ ............................................. F16M 11/00
[52] U.S. Cl. .................................. 248/920; 248/657; 248/346; 74/89.15
[58] Field of Search ............... 238/657, 656, 424, 346, 238/917–924; 108/143; 74/89.15, 424.8 R

[56] References Cited

U.S. PATENT DOCUMENTS

| | | | |
|---|---|---|---|
| 2,890,010 | 6/1959 | Barkheimer | 248/157 |
| 3,313,415 | 4/1967 | Swenson et al. | 209/237 |
| 3,813,491 | 5/1974 | Pennar | 178/7.81 |
| 4,073,556 | 3/1986 | Roman | 74/89.15 X |
| 4,131,776 | 12/1978 | Ehrenberger | 74/89.15 X |
| 4,343,200 | 8/1982 | Alworth et al. | 74/89.15 X |
| 4,372,273 | 2/1983 | Iwatani | 108/143 |
| 4,395,974 | 8/1983 | Callahan | 74/424.8 R |
| 4,515,086 | 5/1985 | Kulecinski | 248/920 |
| 4,547,027 | 10/1985 | Scheibenreif | 339/8 R |
| 4,575,033 | 3/1986 | Henneberg et al. | 248/185 |
| 4,605,188 | 8/1986 | Goetz | 248/157 |
| 4,648,574 | 3/1987 | Granlund | 248/349 |
| 4,659,048 | 4/1987 | Fahrion | 248/285 |
| 4,708,312 | 11/1987 | Rohr | 248/280.1 |
| 4,905,543 | 3/1990 | Choi | 78/827 |
| 4,922,275 | 5/1990 | Hughes | 354/293 |

OTHER PUBLICATIONS

IBM, Technical Disclosure Bulletin vol. 21 No. 3 Aug. 1978.

*Primary Examiner*—Alvin C. Chin-Shue
*Attorney, Agent, or Firm*—Eckert Seamans Cherin & Mellott

[57] ABSTRACT

A device for slowly and smoothly displacing the display unit of a terminal such as a computer work station has a base and a platform movably supported on the base. The platform supports the display terminal and is oscillated back and forth along a path by a linear actuator disposed in the base. A shaft is mounted for rotation on a longitudinal axis and has a groove along the length of its outer surface helically inclined at an angle to the longitudinal axis. A motor rotates the shaft and a follower rides in the groove on the shaft and is connected for transmitting linear motion to the platform as the shaft rotates. The groove includes bidirectional helices joined at the ends by a circumferential groove section. The motor can be a synchronous motor with a gear arrangement providing an output which is laterally and downwardly displaced relative to the motor, whereby the shaft is compactly located immediately adjacent the base of the device providing the device with a low profile capability.

25 Claims, 4 Drawing Sheets

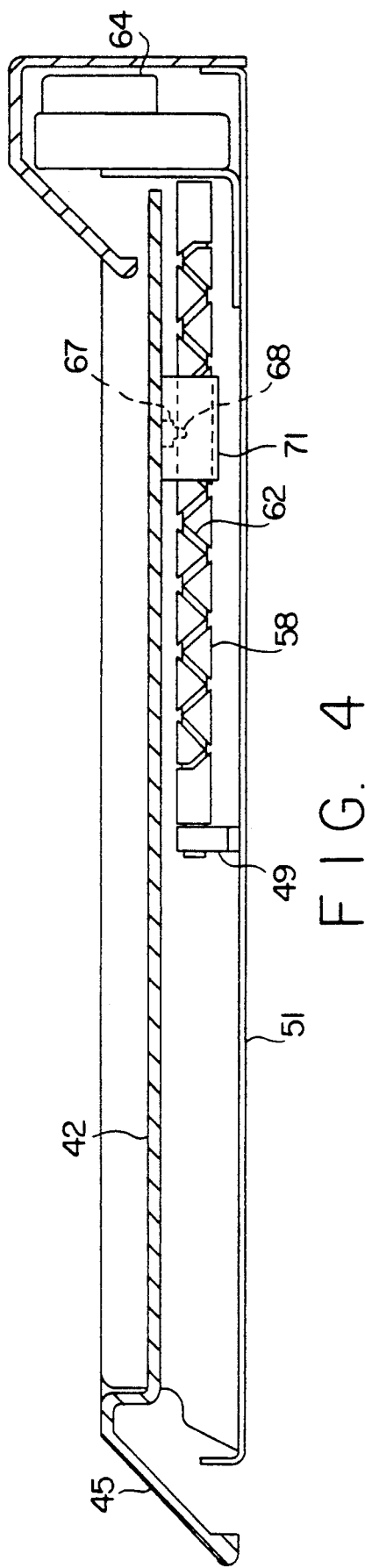
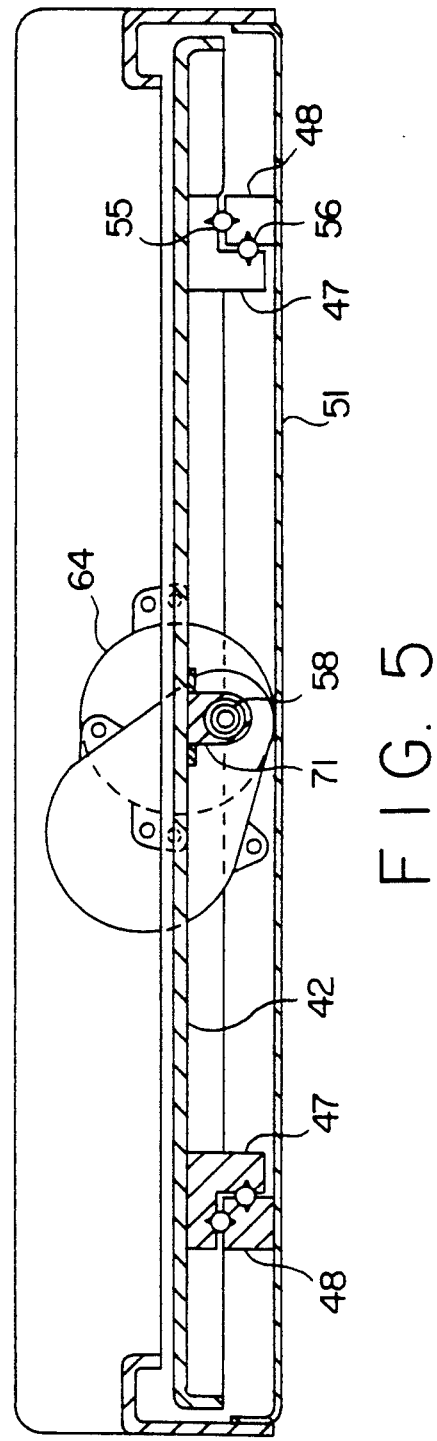

APPARATUS FOR PERIODICALLY DISPLACING A DISPLAY TERMINAL

CROSS REFERENCE TO RELATED APPLICATION

This is a continuation in part of prior application Ser. No. 512,336, filed Apr. 23, 1990, abandoned.

BACKGROUND OF THE INVENTION

1. Field of the Invention

The invention relates to the field of video display terminals, and more particularly to a mechanism for moving the display of a video display terminal periodically along a path which varies the distance from the display to a viewer, thereby contributing to the relief of eyestrain and the like. More particularly, the invention concerns a compact position varying mechanism which can be incorporated into or mounted under a standard display of a video terminal such as a computer work station.

2. Prior Art

Numerous instances of physical complaint including but not limited to eyestrain, muscle strain, mental fatigue, headaches, stress, sore necks and sore backs and even increased spontaneous abortion rates of pregnant females have been reported by viewers who are required by their jobs to maintain a position in front of a display terminal for many hours each day. Typically, the display of a video terminal is placed immediately adjacent the terminal keyboard, which is usually within the user's reach, thus placing the display rather close to the viewer, in a fixed position. Television viewers who intently watch the screen for long periods for business or for pleasure are also potentially subject to such problems; however, television viewers are not limited to a location within reach of the display and typically station themselves farther from the display than do video terminal users. Among those whose occupations require long term close attention to a display screen of a video terminal include, but are not limited to, stock brokers, typists, word processors, scientist, engineers, data entry persons, computer programmers, students, traffic controllers, telephone order takers, etc.

Long term focusing of the eyes at a fixed, relatively close location may tire the focusing muscles in the viewer's eyes and can cause conditions of myopia (nearsightedness), hyperopia (farsightedness), amblyopia (lazy eye), presbyopia (aging process or eyestrain), learning disabilities from poor vision perception, accomodation (focussing), convergence (centering), strabismus (wandering eye), monocular/binocular vision imbalances, muscle and nerve imbalances or inability of the eye to focus effectively at near and far distances. In order to rest the eye muscles, persons will frequently look away from the screen to focus at some more distant point. With age, many persons find it difficult to change focus rapidly between a distant point and a nearby point, requiring correction via bifocal lenses. However, it is widely accepted that individuals subject to such problems can improve their vision by exercising the eye muscles, i.e., by focusing sequentially at different distances. An optical instrument to carry out this type of exercise is disclosed in U.S. Pat. No. 4,294,522—Jacobs. An instrument to relieve eyestrain in television viewers is disclosed in U.S. Pat. No. 3,813,419—Pennar. Pennar teaches a linearly movable television platform which is supported on a pair of parallel axles extending transversely to the direction of movement. Pennar provides a drive motor connected for rotating one of the axles.

Users of video display terminals can benefit from a device which requires them to exercise the focusing muscles of their eyes during periods of display terminal observation. Moreover, the users will be more comfortable if they are not fixed physically in a particular body position for long periods. Eye exercise and the ability to shift in position comfortably can be obtained by changing the distance and direction of the display terminal from the viewer, particularly in connection with a work station which permits the user to vary the position of the keyboard as well. However, there are certain practical problems encountered in the design and configuration of an apparatus to accomplish these objectives. The apparatus must be compact, and have a relatively low profile, such that the display can be located in an optimal beneficial position. Whereas at least a motor is required in a linear actuator for moving the display, and a typical motor and the mounting means therefor require several inches of height, as shown by Pennar, it is difficult to conceive of a practical device which can move the display without occupying undue space. Furthermore, the mechanism must be extremely smooth and quiet, because any noticeable vibration or movement of the display or noise is irritating and distracting. In short, the mechanism must be all but invisible or transparent to the user, occupying minimal space and operating such that the changing position of the display occurs substantially without the user even noticing that this has occurred.

The present invention provides a mechanism for moving a video display terminal in a periodic path with respect to the viewer, thereby requiring the viewer's eyes to focus at varying distances as the display is moved. The mechanism preferably comprises a base and relatively movable platform, with a motor disposed at the rear of the base, coupled to the shaft of a linear actuator having a low pitch bidirectional helical path for carrying a follower linked to the platform. The height of the apparatus is minimal (e.g., hardly more than the diameter of the actuator shaft plus the thicknesses of the base and platform) and the mechanism is smooth and quiet. The positioning apparatus can be arranged to allow the viewer to select certain parameters of operation, such as the period of displacement or the amplitude of the displacement. The entire package is arranged for minimal effect on the configuration and operation of the video display terminal, while achieving the desired periodic or cyclical displacement of display position.

SUMMARY OF THE INVENTION

It is an object of the invention to provide a means for varying the distance between the display portion of the terminal and a viewer thereof.

It is another object of the invention to provide a means for a viewer to exercise his or her eyes during observation of the display, while permitting the viewer to rearrange body position in a comfortable manner, for minimizing eye and muscle strain.

It is a further object of the invention to improve computer work stations and the like having keyboards associated with a display, by providing a position-varying actuator in or under the display, while minimizing usage of space, noise and vibration such that the actuator is substantially unnoticeable.

These and other objects are accomplished by a display terminal displacement device (integral to or separate from the VDT) comprising a base, and a platform movably supported on the base. A shaft defining a longitudinal axis and an outer surface is mounted for rotation about the longitudinal axis. The shaft has a bidirectional helical groove in the outer surface, with a length which spans at least a portion of the length of the shaft and provides a span of displacement. The shaft is coupled to a motor for rotating the shaft about the longitudinal axis. A movable follower means is received within the groove and coupled for transmitting motion to the display as the shaft rotates. Preferably, the shaft and motor are mounted on the base and the follower is mounted on the platform or display. The display screen can be supported on the platform as it moves, thus causing a viewer to continuously change focal length while focusing on the display screen.

The motor is preferably a synchronous motor and gear arrangement having an output shaft displaced laterally from the motor axis such that the actuator shaft can be disposed immediately adjacent the base while the motor protrudes upwardly. The motor is mounted at a rear of the base, enclosed in a cowling, and the platform has a front lip which extends downwardly over the front of the base, such that the overall physical dimensions of the apparatus are minimal to support movement of the VDT, and in particular its height is very small. The apparatus is substantially unnoticeable to the viewer, who unconsciously changes focal length to continue to focus on the display, thereby achieving eye exercise without disrupting user operation of the computer work station or similar video display terminal.

The apparatus is useful in a method of relieving eyestrain for an operator of a video display terminal having a display screen and an operator control station such as a keyboard. The method includes providing a non-rigid communication means between the display screen and the control station, mounting the display screen on a platform, and moving the platform reciprocally with respect to the operator.

BRIEF DESCRIPTION OF THE DRAWINGS

There are shown in the drawings the embodiments of the invention that are presently preferred. It should be understood, however, that the invention is not limited to the precise arrangements and instrumentalities shown in the drawings, which are exemplary. In the drawings.

FIG. 4 is a side elevation view, partly in section, showing the mechanism for moving the display according to the invention, including the motor and bidirectional helical actuator shaft;

FIG. 5 is a front elevation view of the apparatus, also partly in section;

DETAILED DESCRIPTION OF THE PREFERRED EMBODIMENTS

Figure 1:
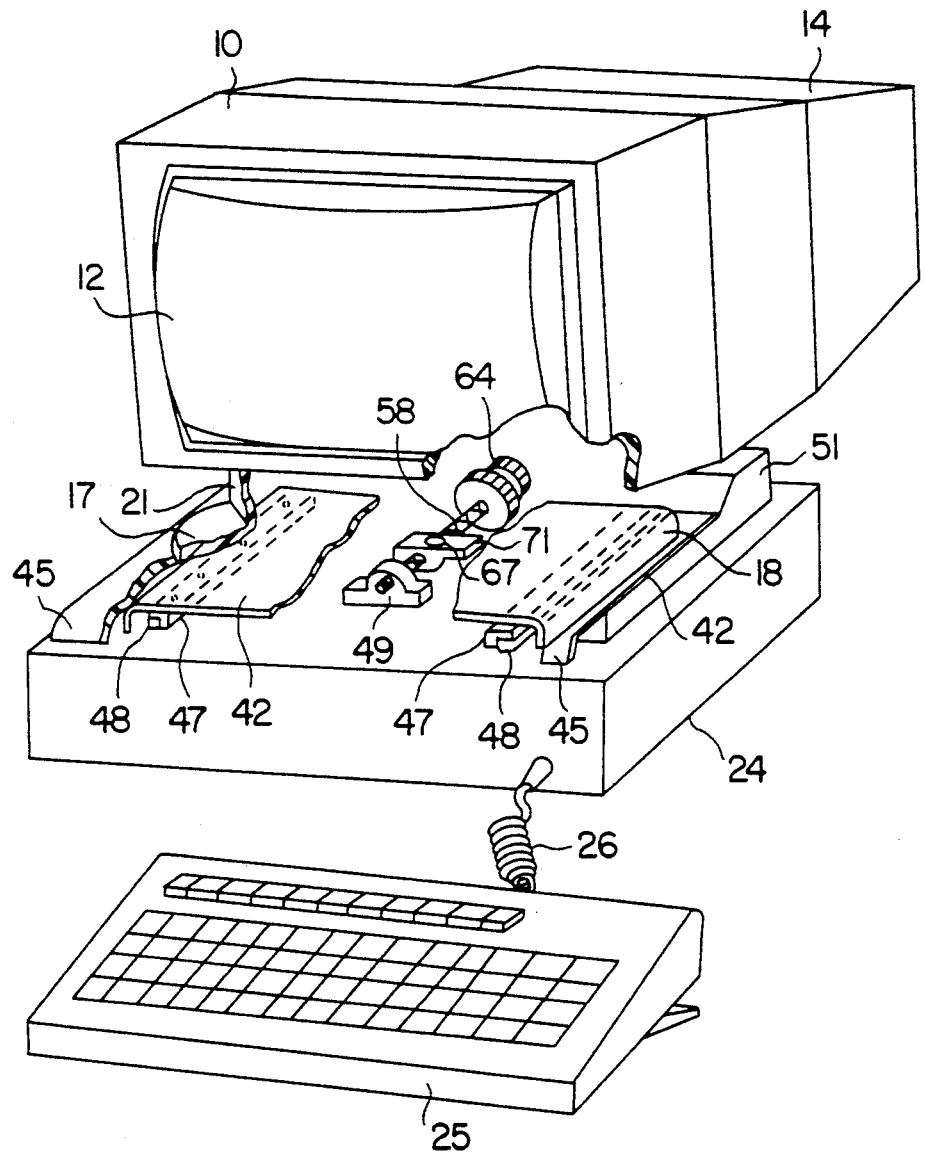
FIG. 1 is a perspective view of the apparatus for periodically displacing a display terminal according to the invention, shown partially cutaway.
Figure 2:
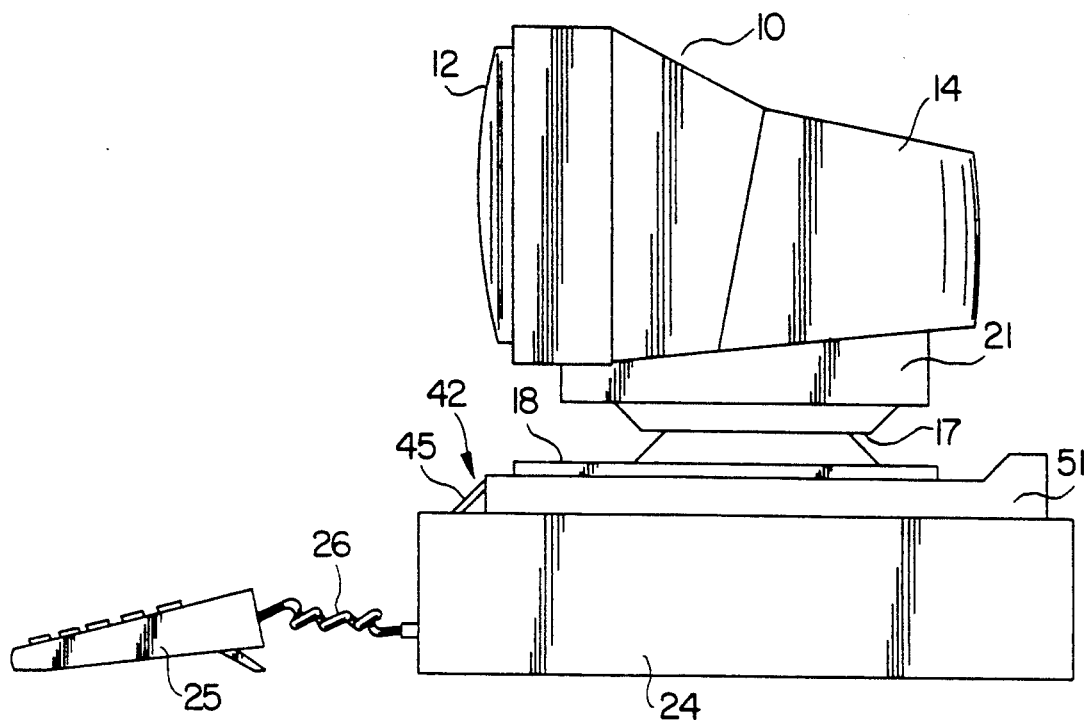
FIG. 2 is a side elevation view of the display of a video display terminal to be periodically displaced relative to the viewer.
Figure 3:
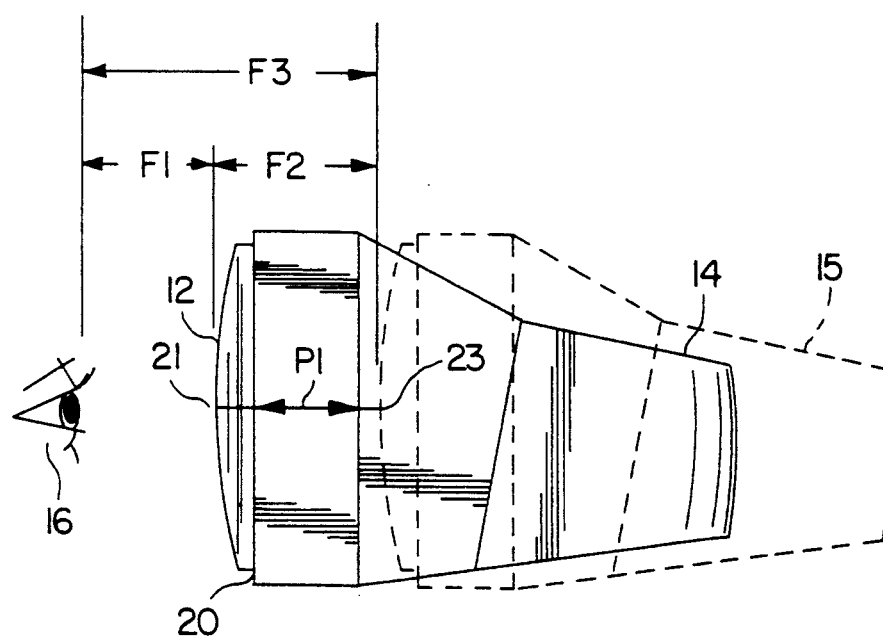
FIG. 3 is a side elevation view showing the displacement path of the display generated by the mechanism of the invention.

Referring to FIGS. 1-7, wherein like references are used to indicate like elements throughout, a video display 10 associated with a computer work station or the like is to be periodically varied in position relative to the viewer so as to cause the viewer to vary focal length while using the terminal. The display is a typical video display 10 as shown in FIGS. 1 and 3 in solid lines, and is to be periodically moved in a path as suggested by the broken lines in FIG. 2. The invention is also applicable to displays of other types, particularly those located relatively close to the viewer, who focuses on the screen 12 of the display 10 continuously, and can even be applied to supports for books or other reading or study material.

The exemplary display 10 shown in the drawings is based on, but not limited to, a cathode ray tube type of VDT and has a visual display screen 12 mounted within a cabinet 14. The display screen 12 may be surrounded by a bezel 20, and due to the elongation of the tube and deflection apparatus the cabinet 14 is elongated in a direction extending away from the viewer 16. The cabinet 14 has a rear protrusion or extension 21 and houses components such as the power transformer, filter capacitors and other components associated with the power supply and electronic processing circuitry needed to decode and display signals received from the processor disposed for example in computer box 24, which typically includes disk drives and the like which are manually accessible to the user. The computer keyboard 25 is located in front of box 24 and is coupled to the terminal via an extendable coiled cable 26. The display cabinet 14 may be pivotally mounted on a stand 18 via pivoting union 17, whereby the viewer can adjust the display screen 12 to a comfortable viewing angle.

The most common form of terminal display, namely a separate unit with a cathode ray tube, is shown as an example. The present invention works equally well with flat displays of other kinds, whether or not the displays are integrated with the associated electronics since the invention is directed toward the object of moving the display and not necessarily any associated electronics. However, the invention is particularly applicable to the CRT form of display, which is relatively heavy and bulky.

In FIG. 3, eye 16 represents the viewer, disposed at a position wherein the angle of viewing subtends the display screen 12. F1 is the viewing distance between the eye 16 of the viewer and the screen 12 of the display unit. The apparatus of the invention slowly and periodically moves the display unit along a path P1 having near end 21 and far end 23. This is accomplished by relatively moving the platform supporting the display cabinet 14 having display 12, relative to a stationary base. Dotted outline 15 shows the position of cabinet 14 when moved by the mechanism of the invention to the point on path P1 furthest from the viewer's eye 16. F2 is thus the excursion of the display screen 12 over the course of a complete movement cycle. As shown in FIG. 3, the path P1 preferably is substantially linear, the length of the path being equal to the displacement F2. It is also possible that the path is not linear or is linear in a direction which is not parallel to the center axis of the CRT.

If the path includes a component lateral to the center axis of the CRT, the length of the path and the focal length displacement F2 will not be the same. It is the user's option as to whether the displacement will include a lateral component, which can be obtained by placing the apparatus of the invention such that the path of displacement is as desired.

An apparatus for moving the display 10 includes a base 51 in the form of a shallow housing for mounting stationary components on its inner surface. The base 51 may be located on a suitable desk, or table top, overhead mount or side wall at a work station for the terminal, or can be placed as shown on the console box 24 of the terminal. The base 51 is preferably formed from a sheet metal plate with upturned edges to define a lower portion of an enclosure for the operating components mounted on base 51, to prevent dust and dirt from accumulating in the operating components, and to provide an overall attractive and compact package for the moving apparatus. The base 51 may be fixed to the console box 24 or to a desk or table top with, for example, threaded fasteners, or may be simply rested thereon, for example, via anti-skid feet in which case the weight of the apparatus and the display unit will prevent unwanted movement.

A platform 42 for carrying the display unit is supported on the base 51, as shown in FIGS. 4 and 5, which are cross sections through the apparatus parallel to the CRT center axis and perpendicular to the center axis, respectively. The platform 42 is movably carried on upper tracks 47 and lower tracks 48. The upper tracks 47 are attached to an underside of the platform 42, and the lower tracks 48 are attached to a top surface of the base 51. Each of the upper and lower tracks has a horizontal and a vertical surface. Opposing pairs of horizontal and vertical surfaces define opposing grooves along a length of each of the surfaces. The opposing grooves between the horizontal surfaces hold a slide apparatus, such as ball bearings 55, and the opposing grooves between the vertical surfaces hold a slide apparatus, such as ball bearings 56. The slide apparatus 55 movably supports a load including the weight of the platform 42 and the weight of the display unit 10. The slide apparatus 56 as supported between the opposed surfaces of the upper and lower tracks 47, 48 resists lateral forces imposed on the platform 42, and resists moment loading of the platform 42 due to an overhung load when the platform 42 is extended beyond an edge of the base 51 as hereinafter described.

The display unit 10 rests on the top surface of the platform 42, which is substantially flat and dimensioned to accommodate the footprint of the display unit 10. The platform 42 is essentially rigid to support the weight of the display unit and like the base is preferably made from metal or from one piece of molded plastic.

The extreme front portion of the platform 42 defines a skirt 45, which extends over the front edge of the base. The skirt 42 conceals the front edge and thereby minimizes the extent to which the relative motion between moving and stationary objects is perceived by the viewer.

A motor 64 drives displacement of the platform 42 relative to the base 51. The motor can be a synchronous motor, including gearing to provide an optional output speed range. It is also possible to provide a motor which is adjustable in output speed, such as a DC motor coupled to a voltage regulator allowing the user to vary the speed or perhaps reverse the motor. The motor 64 is coupled to rotate a shaft 58 which is supported on the base 51 such as by journal mount 49.

The motor is arranged as shown in FIG. 5 such that the axis of the output shaft is displaced laterally outward from the motor and the gearing associated with the motor. Accordingly, the shaft can be placed immediately adjacent the base 51. The motor is preferably placed in an enlarged cowling of the base 51 at the rear, and by virtue of the placement of the shaft adjacent the base, the apparatus only adds minimal height to the position of the display unit. The rear cowling is behind the display unit in use, and thus cannot be seen by the user.

The shaft 58 has a longitudinal axis and an outer surface and is mounted for rotation about the longitudinal axis. The outer surface defines a groove 62, aligned at an angle or pitch relative to the longitudinal axis. The groove 62 has a length which spans at least a portion of the length of the shaft 58 and runs in both directions along the shaft. The groove 62 preferably defines a pair of intersecting helical grooves which are joined by circumferential groove portions at opposite ends of the shaft 58. Thus as the shaft rotates unidirectionally, a follower means received within the groove 62 is linearly displaced with a continuous, reciprocating motion along the length of the shaft 58.

Figure 6:
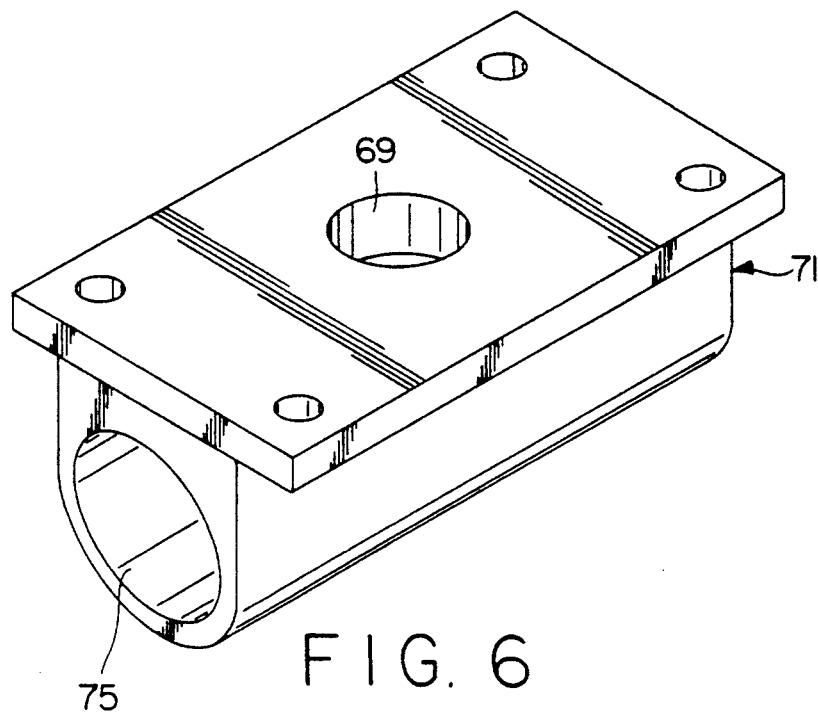
FIG. 6 is a perspective view of a guide holder according to the invention, which moves along the actuator shaft; and, FIG. 7 is a perspective view of the pivoting follower pin carried by the guide holder according to the invention.
Figure 7:
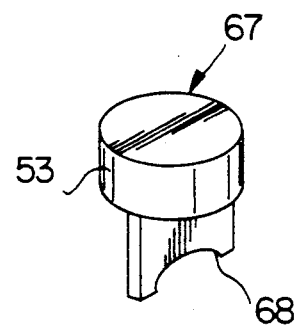

The follower means includes a pivot pin 67, shown in FIG. 7, having a lower end 68 which is generally flat and has an inwardly curved end matched to the radius of shaft 58 at the bottom of the groove 62 such that the lower end 68 slides along the groove. The flat lower end is integrally joined to a cylindrical body portion 53 which fits into a bore in the flanged side of guide holder 71, shown in FIG. 6 such that the pivot pin 67 is captive when the guide holder 71 is attached to the underside of platform 42, for example with screws.

The guide holder 71 and pivot pin 67 transmit the rotary motion of the shaft 58 to a linear motion of platform 42, and the display unit 10 resting on the platform. As shown in FIG. 6, the guide holder 71 defines a bore 75 for receiving the shaft 58 in a slip fit. The guide holder 71 further defines a cavity 69 for slidably and rotatably receiving the body portion 53 of the pivot pin 67. The sidewalls of the cavity 69 maintain the pivot pin 67 perpendicular to the shaft 58. When the pivot pin 67 is received within the cavity 69 and the lower end 68 is received within the groove 62, rotation of the shaft 58 moves the pivot pin linearly due to the helical pitch of the groove 62. The guide holder 71 and platform 42 thus move linearly along the shaft due to force from the wall of the groove 62 acting on the lower end 68 of the pivot pin 67. This movement is transmitted to the platform 42 through the pivot pin holder 71 so that the platform 42 moves along path P1.

At the opposite ends of the grooved span of shaft 58 the oppositely pitched portions of the groove are joined along circumferential end sections of the groove. When the end portion 68 of the pivot pin reaches the end of the groove, the end portion 68 follows the circumferential section to the reversed pitch part of the groove, being thereby rotated in bore 69 from one pitch angle to the opposite pitch angle. In this manner, unidirectional rotation of shaft 58 by motor 64 moves the platform 42 reciprocally with respect to the base 51, causing the display unit to move back and forth along path P1.

In the event the linear actuator according to the invention is arranged with a reversing motor, a single pitch screw thread can be used, with a nut attached to the platform for transmitting linear movement. The dual pitch embodiment shown, however, is preferred because the motion is very smooth through reversing of the direction of displacement of the platform. In order to obtain a similarly smooth motion in a reversing motor embodiment, it is necessary to slow down the motor at the point of reversal and to restart the motor slowly in the opposite direction to avoid vibrating or jerking the display unit as clearance is taken up. With a double pitch shaft as shown, reversing does not noticeably jar the display.

With reference to Figs. 1 and 2, the apparatus of the invention can be embodied directly in the base 18 of the display unit 10, or can be provided as a separable unit which supports the display unit by its base. In an embodiment wherein the apparatus is included in the base, the motor and shaft are preferably mounted to the upper of the base and platform, and the guide holder is mounted to the lower one. The upper part (or platform) in that case is relatively larger than the lower part (or base), and a skirt extending downwardly all around the base 18 conceals the mechanism.

The invention having been disclosed, a number of alternative variations within the scope of the invention will now become apparent to those skilled in the art. Reference should be made to the appended claims rather than the foregoing disclosure of preferred embodiments in order to assess the scope of the invention in which exclusive rights are claimed.

I claim:

1. A video terminal apparatus for slowly reciprocating a display unit of a terminal relative to a viewer operating the terminal, comprising:
   a display unit;
   a stationary base;
   a platform movably supported on the base, defining a surface supporting the display unit;
   a shaft having a longitudinal axis and an outer surface, the shaft being mount to one of the base and the platform for rotation about the longitudinal axis, the shaft having an outer surface defining a groove pitched at an angle to the longitudinal axis, along a length which spans at least a portion of the shaft;
   a motor operable for rotating the shaft about the longitudinal axis;
   follower means mounted on the other of the base and the platform, having a portion which is received in the groove and coupled for transmitting motion to the platform as the shaft rotates; and,
   means for slowly and continually operating the motor, shaft and follower for slowly varying a position of the platform defining the surface for supporting the display unit relative to the base, whereby a focal length between the display unit and the viewer is continually changed at a substantially unnoticeable rate.

2. The apparatus according to claim 1, wherein the follower means comprises a pin having one end received within the groove and a body disposed for transmitting linear motion to the platform with rotation of the shaft.

3. The apparatus according to claim 2, further comprising a guide holder attached to the platform, the guide holder defining a cavity, and wherein the body of the pin is disposed within the cavity.

4. The apparatus according to claim 1, wherein the display unit is a video display of a computer terminal, the apparatus further comprising a keyboard and a processor defining a work station with the display unit.

5. The apparatus according to claim 3, wherein the groove defines a pair of oppositely pitched helical grooves which intersect along a circumferential groove portion at each end of the groove along the shaft.

6. The apparatus according to claim 5, wherein the guide holder defines a bore for rotatably receiving the shaft therethrough.

7. The apparatus according to claim 2, further comprising gear means coupled between the motor and the shaft, and wherein the gear means has an output shaft displaced downwardly relative to the motor, for coupling to the shaft immediately adjacent the base.

8. The apparatus according to claim 1, further comprising longitudinal track means slidably supporting the platform on the base.

9. The apparatus according to claim 8, wherein the track means includes opposed pairs of at least one of horizontal surfaces and vertical surfaces.

10. The apparatus according to claim 9, wherein at least one of said opposed pairs of horizontal surfaces and vertical surfaces defines opposing grooves, and further comprising bearings disposed in the grooves.

11. The apparatus according to claim 1, wherein the motor is reversible for rotating the shaft in an opposite direction.

12. A video terminal apparatus for slowly reciprocating a display unit of a terminal relative to a viewer operating the terminal, comprising;
   a stationary base;
   a platform movably supported on the base, defining a surface for supporting the display unit;
   a shaft having a longitudinal axis and an outer surface, the shaft being mounted to one of the base and the platform for rotation about the longitudinal axis, the shaft having an outer surface defining a groove pitched at an angle to the longitudinal axis, along a length which spans at least a portion of the shaft;
   a motor operable for rotating the shaft about the longitudinal axis;
   follower means mounted on the other of the base and the platform, having a portion which is received in the groove and coupled for transmitting motion to the platform as the shaft rotates; and,
   means for slowly and continually operating the motor, shaft and follower for slowly varying a position of the platform defining the surface for supporting the display unit relative to the base, whereby a focal length between the display unit and the viewer is continually changed at a substantially unnoticeable rate.

13. The apparatus according to claim 12, wherein the follower means comprises a pin having one end received within the groove and a body disposed for transmitting linear motion to the platform with rotation of the shaft.

14. The apparatus according to claim 13, further comprising a guide holder attached to the platform, the guide holder defining a cavity, and wherein the body of the pin is disposed within the cavity.

15. The apparatus according to claim 14, wherein the groove defines a pair of oppositely pitched helical grooves which intersect along a circumferential groove portion at each end of the groove along the shaft.

16. The apparatus according to claim 15, wherein the guide holder defines a bore for rotatably receiving the shaft therethrough.

17. The apparatus according to claim 13, further comprising gear means coupled between the motor and the shaft, and wherein the gear means has an output shaft displaced downwardly relative to the motor, for coupling to the shaft immediately adjacent the base.

18. The apparatus according to claim 12, further comprising longitudinal track means slidably supporting the platform on the base.

19. The apparatus according to claim 18, wherein the track means includes opposed pairs of at least one of horizontal surfaces and vertical surfaces.

20. The apparatus according to claim 19, wherein at least one of said opposed pairs of horizontal surfaces and vertical surfaces defines opposing grooves, and further comprising bearings disposed in the grooves.

21. The apparatus according to claim 12, further comprising a depending front skirt on the platform, the front skirt concealing relative displacement of the platform and the base.

22. The apparatus according to claim 12, wherein the motor is reversible for rotating the shaft in an opposite direction.

23. A method of relieving eyestrain for a viewer operating a video display of a terminal, said terminal having a display screen and a control station, comprising the steps of:
providing a non-rigid communication means between the display screen and the control station;
mounting the display screen on a platform; and,
slowly and continually reciprocating the video display toward and away from the viewer, at a substantially unnoticeable rate;
wherein the reciprocating step comprises providing a shaft having a longitudinal axis and an outer surface, the shaft being mounted to one of the base and the platform for rotation about the longitudinal axis, the shaft having an outer surface defining a groove pitched at an angle to the longitudinal axis, along a length which spans at least a portion of the shaft, a motor operable for rotating the shaft about the longitudinal axis, follower means mounted on the other of the base and the platform, having a portion which is received in the groove and coupled for transmitting motion to the platform as the shaft rotates, and, means for slowly and continually varying a position of the platform defining the surface for supporting the display unit, relative to the base, whereby a focal length between the display unit and the viewer is slowly and continually changed such that the viewer focuses at different distances at different times while using the terminal, without substantially noticing movement of the display unit.

24. A video terminal apparatus for slowly reciprocating a display unit of a terminal operated by a viewer, comprising;
a display unit;
a stationary base;
a platform movably supported on the base, defining a surface for supporting the display unit;
a shaft having a longitudinal axis and an outer surface, the shaft being mounted to one of the base and the platform for rotation about the longitudinal axis, the shaft having an outer surface defining a groove pitched at an angle to the longitudinal axis, along a length which spans at least a portion of the shaft;
a motor operable for rotating the shaft about the longitudinal axis;
follower means mounted on the other of the base and the platform, having a portion which is received in the groove and coupled for transmitting motion to the platform as the shaft rotates; and,
means for continuously operating the motor, shaft and follower for slowly and continuously reciprocating the platform defining the surface for supporting the display unit relative to the base, whereby a focal length between the display unit and the viewer is slowly and continuously changed, and the viewer focuses at different distances at different times while operating the terminal;
wherein the height of the platform defining the surface for supporting the display unit above the base is substantially limited to a sum of thicknesses of the shaft, the base and the platform, thereby minimizing height of the display unit.

25. A video terminal apparatus for slowly reciprocating a display unit of a terminal operated by a viewer, comprising;
a stationary base;
a platform movably supported on the base, defining a surface for supporting the display unit;
a shaft having a longitudinal axis and an outer surface, the shaft being mounted to one of the base and the platform for rotation about the longitudinal axis, the shaft having an outer surface defining a groove pitched at an angle to the longitudinal axis, along a length which spans at least a portion of the shaft;
a motor operable for rotating the shaft about the longitudinal axis;
follower means mounted on the other of the base and the platform, having a portion which is received in the groove and coupled for transmitting motion to the platform as the shaft rotates;
means for continuously operating the motor, shaft and follower for slowly and continuously reciprocating the platform defining the surface for supporting the display unit relative to the base, whereby a focal length between the display unit and the viewer is slowly and continuously changed, and the viewer focuses at different distances at different times while operating the terminal; and
wherein the height of the platform defining the surface for supporting the display unit above the base is substantially limited to a sum of thicknesses of the shaft, the base and the platform, thereby minimizing height of the display unit.

* * * * *